April 2, 1935.  E. KETTERER  1,996,620
TIGHTENING MEANS FOR THE COMPRESSION AND SUCTION
CHAMBERS OF ROTARY PISTON ENGINES
Filed Oct. 15, 1932   3 Sheets-Sheet 1
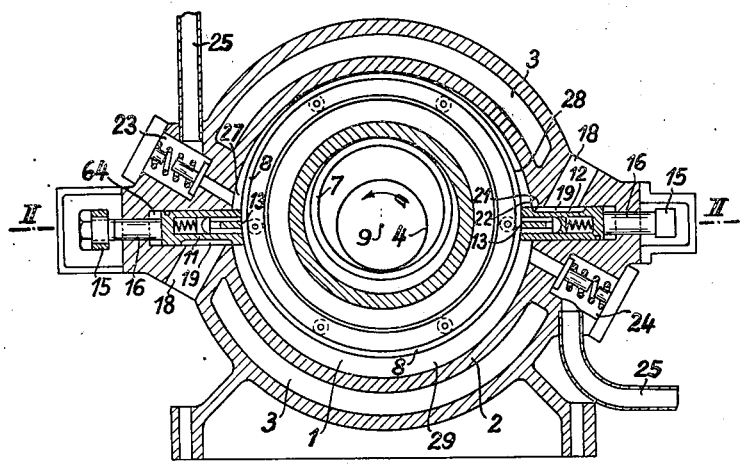
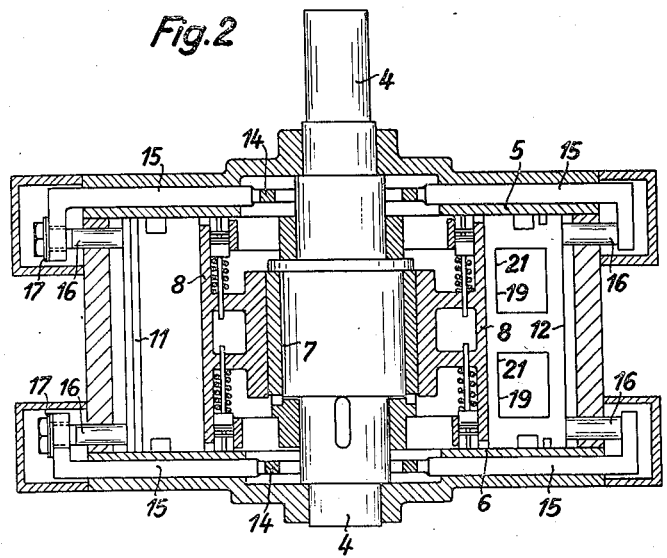

April 2, 1935. E. KETTERER 1,996,620
TIGHTENING MEANS FOR THE COMPRESSION AND SUCTION
CHAMBERS OF ROTARY PISTON ENGINES
Filed Oct. 15, 1932 3 Sheets-Sheet 2
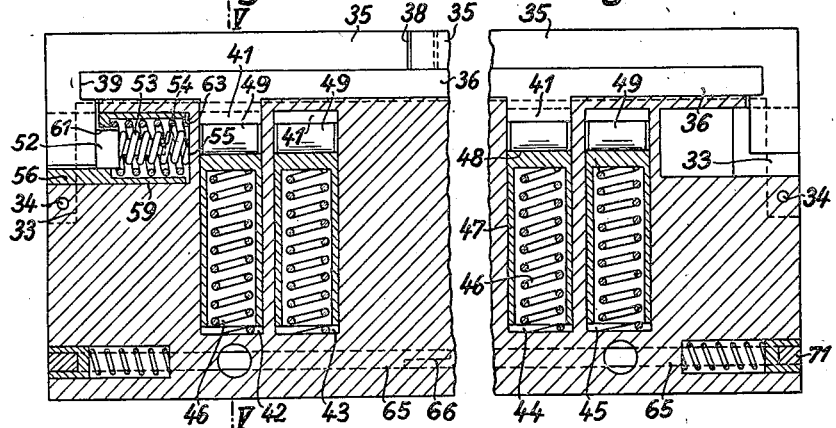
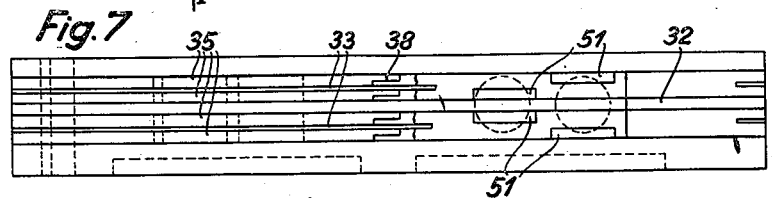
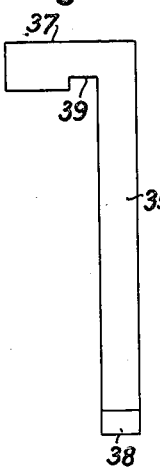
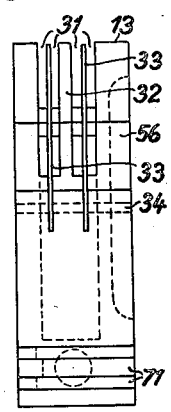
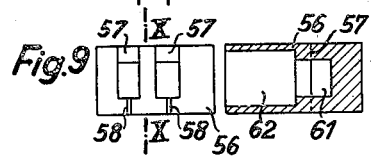
Inventor:
Eugen Ketterer

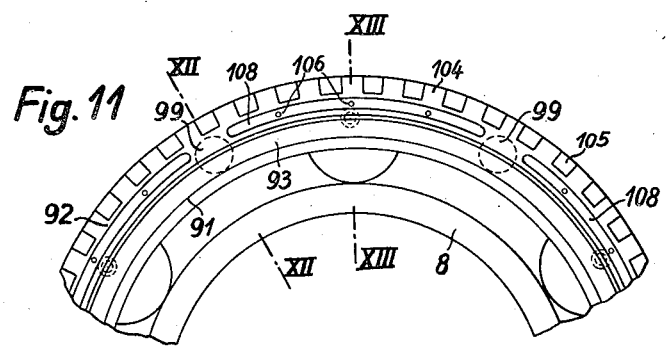
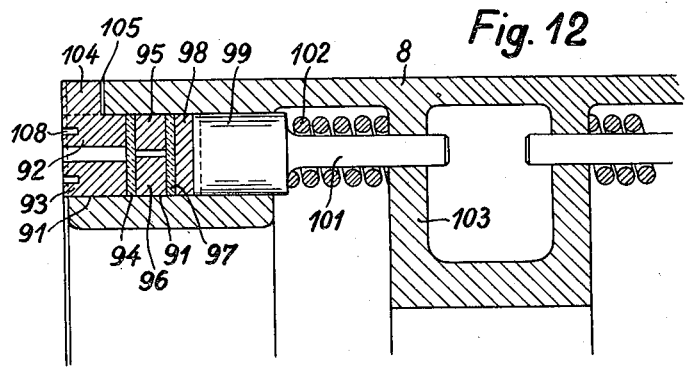
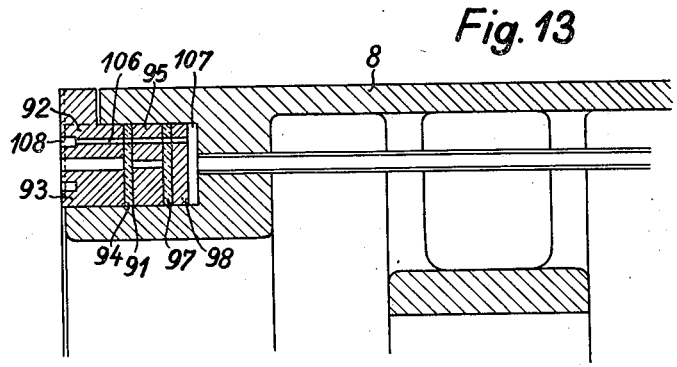

Patented Apr. 2, 1935

1,996,620

UNITED STATES PATENT OFFICE 1,996,620

TIGHTENING MEANS FOR THE COMPRESSION AND SUCTION CHAMBERS OF ROTARY PISTON ENGINES

Eugen Ketterer, Essen, Germany, assignor of one-half to Herman Reis, Essen, Germany Application October 15, 1932, Serial No. 637,907
In Germany October 19, 1931

6 Claims. (Cl. 103—123)

The invention relates to rotary piston engines in which in a cylinder space a cylindrical piston of smaller diameter is moved in a manner such as to touch by its periphery successively the generatrices of the inner surface of the cylinder and in this way the space formed between the piston and the inner surface of the cylinder and having a sickle-shaped cross section travels round the axis of the cylinder space. By means of slides mounted in the cylinder casing and adapted to slide radially to the cylinder axis the travelling sickle-shaped space is subdivided into chambers which according to the mode of use of the engine serve to suck, expel, compress or expand the working agent used, such as air, gas, steam or liquid.

The efficiency of rotary piston engines of this class depends to a high extent upon the effect of the tightening means provided between the compression and suction chambers, that is, upon the manner in which the slides are tightened relatively to the rotary piston and to the cylinder casing on the one hand, and the rotary piston relatively to the cylinder casing on the other hand.

As to the slides, it is known to make use of, in seals of this type, a plurality of spring-influenced tightening bars arranged in parallel to the axis of the rotary piston. It is further known to urge a plurality of tightening bars by means of one common pressure member. In these known arrangements the provision of sufficiently strong springs for the individual tightening bars is difficult, due to the small space at disposal, and, if the sole pressure member is provided for all tightening bars, the seal grows worse by the individual tightening bars wearing in different degree.

As the seal of the chambers on the front surface of the piston is concerned, it has been proposed to provide packing rings lodged in outer annular chambers of the piston and resiliently pressed on the side walls of the cylinder. In this arrangement too, however, the degree of tightening is not sufficient for high pressure compressors and other engines operating under high pressure, as the pressure is equalized along the lateral surface of the packing rings and particularly also in the spaces within their inner surfaces, from the compression to the suction chambers.

In order to eliminate these drawbacks, the mutual sealing of the suction and compression chambers is effected according to the invention by the tightening bars of the slides being resiliently pressed against the periphery of the piston independently of one another by the action of spring-influenced pressure pieces each of which acts upon two bars and is disposed in the midst between them, while, further, packing rings provided on the front surfaces of the piston are acted upon by spring-actuated pressure pistons which are sealingly mounted in the rotary piston and subdivide the space behind the packing rings into separate chambers.

In the drawings are illustrated by way of example an embodiment of the invention as applied to a double-acting rotary piston compressor, and more particularly show Fig. 1 a sectional lateral view of the compressor, Fig. 2 a top view thereof, as section on the line II—II of Fig. 1, Fig. 3 a detail of the slide on enlarged scale and in section on the line III—III of Fig. 5, Fig. 4 a similar view of the slide in section on the line IV—IV of Fig. 5, Fig. 5 a section of the slide on the line V—V of Fig. 3, Fig. 6 an end view of the slide, seen from the left in Fig. 3, in which the tightening bars are withdrawn, Fig. 7 a top view of the structure shown in Figs. 3 and 4, in which part of the tightening bars is withdrawn, Fig. 8 a detail view of a tightening bar, Fig. 9 an end view of a tightening member for the ends of the slide, Fig. 10 a section on the line X—X of Fig. 9, Fig. 11 a partial end view of the rotary piston, Fig. 12 a section on the line XII—XII of Fig. 11 and Fig. 13 a section on the line XIII—XIII of Fig. 11.

Coaxially with the cylinder space 1 (Figure 1) of the cylinder casing 2 surrounded by a cooling chamber 3 is mounted for rotation a shaft 4 in side walls 5, 6 (Figure 2) that laterally seal the cylinder space 1. The shaft 4 has in the center an eccentric projection 7 on which the rotary piston 8 is loosely revolubly mounted. The latter is sealed on its front sides relatively to the side walls 5, 6. In the cylinder casing 2 are arranged so as to move in the central plane of the axis 9 (Figure 1) of the shaft 4 two slides 11, 12 which by their piston-sealing surfaces 13 abut against the periphery of the rotary piston 8, their permanent contact with the rotary piston 8 being secured by two systems of rods 14, 15, 16, 17 attached to their ends.

As will be seen from Figure 1, the slides 11 and 12, which serve to subdivide the sickle-shaped space formed between the rotary piston 8 and the inner surface of the cylinder 1 into suction and compression chambers 27, 28, 29, simultaneously control the air feeds to the spaces that just are suction chambers, by channels 18, open to the outer air and formed in the cylinder casing, opening into recesses 19 of the slides 11 and 12, respectively, the inner edges 21 of which recesses in co-operation with the adjacent edges 22 of the inner surface of the cylinder form, with corresponding inward motion of the slides, inlet ports for the air to be sucked. Near the upperside of the slide 11 and near the underside of the slide 12 is provided each a pressure valve 23 and 24, respectively (Figure 1), from which a pipe 25 leads to the pressure container (not shown).

The tightening arrangement of the slides relatively to the rotary piston and the cylinder casing, forming the subject-matter of the invention, will now be described in detail with reference to Figures 3 to 10. As will be seen from the end view of the slide according to Figure 6, the piston-sealing surface 13 of the slide and also a part of the two ends of the slide is provided with four through-going grooves 31 obtained by two notches with a rib 32 therebetween and by two thin intermediate sheet metal plates 33. The latter are fixed to the body of the slide by pins 34 (Figures 3, 4, 6). Each of the grooves is filled by a two-part tightening bar 35 and by a pressure bar 36.

The shape of one half of tightening bar is to be seen from Figure 8. It possesses on one end a rectangularly bent extension 37 by which the seal on the front sides of the slide is effected, and on the other end an offset 38 in which engages the correspondingly offset end of the other half of the tightening bar. The two halves of the tightening bar completely conform with one another in shape and size so that they may be replaced and exchanged at will. The pressure bars 36 (Figures 3, 4) engage by their ends in recesses 39 of the tightening bars 35 in such a manner as to permanently remain by their outer narrow surface in close contact with the tightening bars 35. Each pressure bar 36 further possesses two extensions 41 by which it projects into the interior of the slide body.

In the slide are provided four spring chambers 42, 43, 44, and 45. In each of these chambers is slidably mounted a pressure piston 47 in a bore of which is lodged a compression spring 46. On its top end each pressure piston 47 has a semi-cylindrical cavity 48 (Figures 4, 5) in which loosely rests a semi-cylindrical pressure piece 49. With the plane top surface of these pressure pieces are in contact the above-mentioned extensions 41 of the pressure bars 36, each of the pressure pieces 49 acting upon two pressure bars 36 arranged equidistantly to its turning axis in such a manner that the pressure exerted by the spring 46 is uniformly distributed on the two pressure bars 36 and thus to the tightening bar 35 influenced by the latter.

As will be seen from Figure 5, the pressure pieces 49 of the spring chambers 42 and 45 act upon the two outer pressure bars 36, whilst the pressure pieces 49 of the spring chambers 43, 44 actuate the two inner pressure bars 36. From Figure 7, in which part of the pressure bars and tightening bars are withdrawn, is clearly to be seen the arrangement of the passage openings 51 for the various extensions 41. As will be seen, the influence by pressure of the various tightening bars 35 is such that each tightening bar may abut against the rotary piston independently of the other.

The division of the tightening bars into two parts is required by the end tightening means of the slide hereinafter described. As a consequence of this division, however, more or less great passage openings occur on the overlapping places, which may allow leakage of the working agent. The object proper of the pressure bars 36 is to prevent this leakage. By the fact that they abut by their upper narrow surfaces closely against the tightening bars 35 and are held in this contact by the recesses 39, the various openings on the overlapping places are prevented from entering into communication with one another through the space existing below the bars 35. If this tightening of the overlapping places were not required, the pressure bars 36 could be omitted, if the extensions 41 were provided immediately on the tightening bars 35.

As already mentioned, the seal of the slide on the ends is effected by the extensions 37 of the tightening bars 35. These extensions are acted upon by a pressure piece 52 (Figure 3) which terminates in a bolt 54 surrounded by a spring 53. The latter abuts on an inner surface 55 of the slide body and presses the four extensions 37 of the respective slide end simultaneously against the inner surface of the side wall 5 or 6 of the cylinder (Figure 2).

In order to seal also the passages formed between the extensions 37, a special sealing member 56 (Figure 3, 6, 9 and 10) is provided which, as will be seen from Figure 6, occupies the whole width of the end of the slide and has recesses 57 and slots 58 (Figure 9) into which sealingly project the extensions 37 and, respectively, the intermediate sheet metal plates 33. The sealing member 56 is shiftably mounted in a corresponding space 59 (Figure 3) of the slide body; 56 is hollow and carries the above-mentioned pressure piece 52 in a smaller rectangular cavity 61 (Figures 3-10), which, as to be seen from Figure 10, is open toward the recesses 57, while an enlarged cavity 62 guides a compression spring 63 which surrounds the spring 53 and likewise abuts against the surface 55 of the slide so as to sealingly press the front side of the sealing member 56 against the side walls 5 and 6, respectively, independently of the extensions 37. It will be seen that in this way the compression and suction chambers partioned off by one slide 11, 12 are perfectly tightened relatively to the end of the slide.

During the reciprocating motion of the slides 11 and 12 notable inertia effects occur in consequence of the comparatively high rate of revolution of the shaft 4 of about 1000 R. P. M. which effects cause the slides to move beyond the dead position determined by the eccentricity of the eccentric 7 (Figure 1) and to elastically influence also the rotary piston 8 in such a manner that it tends to enter the slide space of the cylinder casing and upon further motion strikes against the edge 22 (Figure 1). In order to overcome this drawback which in the length of time of operation may cause damaging of the piston and the inlet edge 22 and a knocking run of the compressor, a further packing 65, 66, 71 (Figures 3, 4, and 6) of known construction is provided on each slide 11, 12 by which the space denoted by 64 in Figure 1, that is the space behind the slide, is sealed outwardly. In this way, owing to the compression of the air contained therein, this space acts as a cushion when the slide moves outwards, and prevents a motion of the slide and of the rotary piston beyond the dead position.

Since the two slides are permanently held by the system of rods 14, 15, 16 at the same mutual distance which exactly corresponds to the diameter of the rotary piston 3, the height of the surface on which the tightening bars 35 are distributed on the slides must be as great as double the eccentricity of the eccentric 7, because otherwise at certain moments a close contact between the slides and the piston would not be possible.

In the following will now be described in detail the sealing of the ends of the rotary piston with reference to Figures 11-13.

On each piston side is arranged an annular channel 91 which has mounted in it one or more metallic packing rings 92, 93. On the right-hand side then follows an annular packing disc 94 (Figures 12 and 13), and then two spring rings 95, 96, one of which is resilient in outward direction while the other is resilient in inward direction. The two spring rings may be disposed side by side or, as illustrated, in the same plane. Then follows another annular packing disc 97 and, further, a pressure ring 98, preferably made from steel. The pressure ring 98 is acted upon by equidistantly arranged pressure pistons 99 (Figures 11, 12) which are tightly mounted in corresponding bores of the rotary piston 8 and on their offset inner ends 101 (Figure 12) carry compression springs 102 that abut against the partition 103 of the hub of the rotary piston. As will be seen, the packing rings 92, 93 are pressed in this way uniformly onto the side wall of the cylinder and any passage happening to exist between their peripheral surfaces and the annular channel 91 is efficaciously tightened by the two spring rings 95, 96 and the annular packing ring 94.

Suitably the outer packing ring is provided with a crown of teeth 104 (Figures 11 and 12), which engage in a corresponding crown of teeth 105 provided on the outer part of the rotary piston.

The tightening pressure of the two packing rings 92, 93 has to be particularly strong in those parts of the rings which just are in the range of the compression chambers (chamber 27, Figure 1), whilst for the remaining parts of the rings the tightening pressure may be correspondingly smaller. In order to obtain such a different distribution of the pressure, the pressure itself prevailing in the compression chambers is used to contribute to the tightening pressure by being led behind the packing rings 92, 93. To this end the outer packing rings 92, the outer spring ring 95, the annular packing discs 94, 97, and the pressure ring 98 are provided with bores 106, as to be seen from Figure 13. If that part of the packing ring 92 which is in the range of a compression chamber, is not sufficiently pressed against the side wall of the cylinder, the more or less throttled pressure prevailing in the compression chamber is thus capable of entering between this ring part and the side wall of the cylinder in the bore 106 and spreading out behind the pressure ring 98 in the space 107 of the annular channel 91. The consequence thereof is that a supplemental pressure is added on the respective place to the invariable tightening pressure of the springs 102 by which the complete tightening is obtained with security.

It has now to be avoided that the pressure entering from the compression chamber in the space 107 be distributed on the whole annular space 107, since it has to act, as explained, only on those parts of the packing rings which just are in the range of the compression chambers. To this end the space 107 is subdivided into individual chambers which are sealed relatively to one another, and this is effected immediately by the pressure pistons 99 (Figure 12), the diameter of which exactly corresponds to the height of the annular channel 91. According to Figures 1 and 11 six such pressure pistons 99 are provided which between themselves form six separate chambers of the space 107. In practice one will increase as possible the number of the pistons and thereby that of the chambers. In order to conveniently and securely feed the pressure to the bores 106, the latter open into open channels 108 the location and length of which correspond to the chambers of the space 107.

The excellent efficiency of the described tightening arrangement for the sides of the rotary piston is due primarily to the subdivision of the space 107 existing behind the pressure ring 98, into indivdual chambers, as well as due to the co-operation of the pressure of the working agent for urging the tightening rings onto the cylinder side wall. It is evident that these main effects are obtained also, if, in order to simplify the arrangement, instead of the members 92—98 one sole packing ring with bores 106 and corresponding open channels 108 is arranged in the annular channel and is pressed directly onto the cylinder wall by the pistons 99. Obviously, several such simplified packing rings may be provided on each piston end, concentrically to one another.

I claim:—

1. In an engine of the class described a cylinder casing, a rotary piston rolling in said casing, a slide shiftably mounted in said casing and dividing the space existing between said piston and casing into compression and suction chambers, a plurality of tightening bars shiftably mounted in said slide and adapted to co-operate with the periphery of said piston, partitions fixed in said slide and separating the tightening bars from each other, said tightening bars being arranged in pairs, the bars of the pairs overlapping one another, pressure pieces adapted to act each upon the two tightening bars of each pair and having semi-cylindrical shape, pressure pistons shiftably mounted in said slide and formed on their outer ends with cavities receiving the semi-cylindrical surfaces of said pressure pieces, and spring members adapted to act upon said pressure pieces in the middle between their points of action upon said bars and adapted to urge the latter independently of one another onto said piston.

2. In an engine of the class described a cylinder casing, a rotary piston rolling in said casing, a slide shiftably mounted in said casing and dividing the space existing between said piston and casing into compression and suction chambers, a plurality of tightening bars shiftably mounted in said slide and adapted to co-operate with the periphery of said piston, spring-influenced pressure pieces adapted to act upon said tightening bars, a pressure bar belonging to each tightening bar and arranged between the pressure pieces and the inner edge of the respective tightening bar.

3. In an engine of the class described a cylinder casing, a rotary piston rolling in said casing, a slide shiftably mounted in said casing and dividing the space existing between said piston and casing into compression and suction chambers, a plurality of tightening bars shiftably mounted in said slide and adapted to co-operate with the periphery of said piston, spring-influenced pressure pieces adapted to act upon said tightening bars, the latter being subdivided, inner recesses on their ends, a pressure bar arranged between said subdivided tightening bars and said pressure pieces and engaging by its ends in said recesses.

4. In an engine of the class described, a cylinder casing, a rotary piston rolling in said casing, a slide shiftably mounted in said casing and dividing the space existing between said piston and casing into compression and suction chambers, a plurality of tightening bars shiftably mounted in said slide and adapted to co-operate with the periphery of said piston, said tightening bars being subdivided, a rectangularly bent extension on the end of each tightening bar, a spring adapted to urge the extension against the side wall of said cylinder, a sealing member shiftably mounted at each end of said slide, slots in said sealing member adapted to be engaged by said extensions, ribs on said sealing member formed by said slots and sealingly filling the intermediate spaces between said extensions, and a second spring adapted to urge the sealing member against the side wall of said cylinder.

5. In an engine as specified in claim 4 a hollow space in said sealing member, an offset therein, a compression spring adapted to act upon said offset, another compression spring arranged concentrically to the former and adapted to act upon the extensions of said tightening bars.

6. In an engine of the class described a cylinder casing, a rotary piston rolling in said casing, a slide shiftably mounted in said casing and dividing the space existing between said piston and casing into compression and suction chambers, a plurality of tightening bars shiftably mounted in said slide and adapted to co-operate with the periphery of said piston, an annular channel on the end surface of said rotary piston, packing rings in said channel, spring-influenced pressure pistons shiftable in the direction of the axis of said rotary piston and adapted to urge said packing rings onto the side walls of said cylinder, sealing means between said pressure pistons and the walls of said channel whereby the space existing behind said packing rings is subdivided into separate chambers.

EUGEN KETTERER.